United States Patent [19]

Schmitter et al.

[11] 3,941,725

[45] Mar. 2, 1976

[54] PROCESS FOR THE MANUFACTURE OF EPOXIDE RESIN FOAMS

[75] Inventors: André Schmitter, Hegenheim, France; Rolf Hügi, Basel; Wolfgang Seiz, Pfeffingen, both of Switzerland

[73] Assignee: Ciba-Geigy Corporation, Ardsley, N.Y.

[22] Filed: Sept. 9, 1974

[21] Appl. No.: 504,629

[30] Foreign Application Priority Data

Sept. 14, 1973 Switzerland.................... 13276/73

[52] U.S. Cl............................ 260/2.5 EP; 260/2.5 R
[51] Int. Cl.² C08G 59/12; C08G 59/20; C08J 9/02; C08J 9/30
[58] Field of Search................ 260/2.5 EP, 2.5 R

[56] References Cited
UNITED STATES PATENTS

| | | | |
|---|---|---|---|
| 3,282,863 | 11/1966 | Carey et al.................. | 260/2.5 EP |
| 3,373,121 | 3/1968 | Burgert et al................. | 260/2.5 EP |
| 3,600,337 | 8/1971 | Fischer et al................. | 260/2.5 EP |

*Primary Examiner*—Joseph L. Schofer
*Assistant Examiner*—F. R. Cervil
*Attorney, Agent, or Firm*—Vincent J. Cavalieri

[57] ABSTRACT

Epoxide resin foams are manufactured by curing a mixture which contains an epoxide resin, a blowing agent, a surface-active agent and the tetraglycidyl ester of cyclohexanone- or methylcyclohexanone-2,2,6,6-tetrapropionic acid, with a Lewis acid or an addition compound or complex compound of a Lewis acid. The foams obtained show a homogeneous pore structure and no tendency to crack formation, and are heat-stable and largely light-fast. They can be employed in sandwich constructions, as insulating materials against heat and cold, sound and mechanical impact, and in the electrical industry.

3 Claims, No Drawings

PROCESS FOR THE MANUFACTURE OF EPOXIDE RESIN FOAMS

Epoxide resin foams are distinguished by good strength and dimensional stability, low water absorption, good heat resistance and, in general, good resistance to chemical factors. Their heat resistance, light resistance and stability at elevated temperatures are better then those of polyurethane foams. Foams of low density are used, for example, as potting agents for electronic equipment or as fillers in parts of honeycomb structures which are subjected to pressure. Foams of higher density can be employed as constructional elements, as heat-insulating coatings or for the manufacture of straight-edges for building work and checking work.

A disadvantage is the tendency to strains in epoxide resin-foams, which frequently occurs and leads to crack formation. Admittedly, it has already proved possible largely to avoid these strains by adding certain materials or using certain curing agents (for example Swiss Patent Specifications 490,451 and 505,177). However, in these processes it is necessary to accept the fact that to achieve satisfactory cured foams the proportion of curing agent must, for each fresh batch, be suited to the amount of resin used, that is to say the ratio of resin to curing agent varies with the amount of resin. Crack-free and strain-free epoxide resin foams can also be manufactured in accordance with the process disclosed by British Patent Specification 1,009,164, wherein organosilicon compounds are used. In this case, however, quick-acting curing agents cannot be employed so that the very long curing time is an adverse factor for many purposes.

A process for the manufacture of epoxide resin foams has now been found in which these disadvantages do not apply and no tendency to cracks, and no shrinkage, is detectable even when the resin is foamed to form large blocks.

According to the process of the invention, a resin mixture which contains an epoxide resin based on bisphenol A and/or a polyester containing epoxide groups and/or an aliphatic polyglycidyl ether or a cycloaliphatic epoxide resin and in addition contains the tetraglycidyl ester of cyclohexanone- or methylcyclohexanone-tetrapropionic acid of the formula I

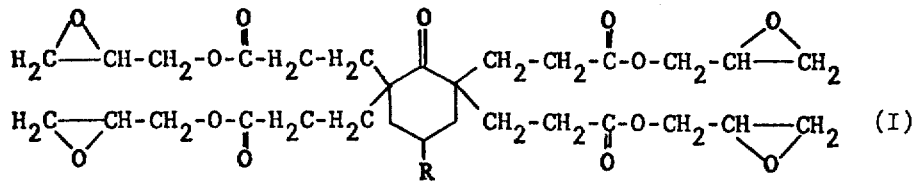

in which R denotes hydrogen or the methyl group, and a blowing agent and a surface-active agent to regulate the pore structure, is cured with a Lewis acid or an addition compound or complex compound thereof.

The ratio of the amounts in which the epoxide resin and the tetraglycidyl ester of the formula I are employed can vary greatly. Good foams are obtained on the one hand with 25 parts by weight of epoxide resin per 75 parts by weight of the compound I and on the other hand with 75 parts by weight of epoxide resin per 25 parts of the compound I.

Preferably, the resins based on bisphenol A have an epoxide equivalent weight of 100 to 500.

The following are examples of compounds which can be used as curing agents: boron trifluoride, aluminium chloride, tin chloride, iron-(III) chloride, zinc chloride and antimony-(III) trichloride, as well as their complexes with, for example, water, diethyl ether, acids, such as acetic acid and phosphoric acid, anhydrides, phenols, a monofunctional or polyfunctional alcohol, acid amides, amines or esters.

Solvents which can be used for these catalysts are carboxylic acids, esters, carboxylic acid anhydrides, aliphatic monools or polyols, cycloaliphatic polyols, aromatic polyols or phosphoric and esters. The solvents are in general employed in concentrations of 1 – 100 parts by weight, relative to 100 parts by weight of the epoxide resin.

The curing catalysts are suitably employed in concentrations of 0.3 – 2% by weight, preferably of 0.5 – 1% by weight, relative to the resin mixture.

Preferably, liquid epoxide resins are employed for foaming at room temperature. However, it is also possible to use solid epoxide resins which are dissolved in liquid resins or in comonomers. Comonomers which can be used are monoepoxide compounds, such as epichlorohydrin and phenyl glycidyl ether, cyclic ethers, such as oxacyclobutane, tetrahydrofurane and trioxane, and lactones, such as propiolactone, butyrolactone, valerolactone or caprolactone.

The foaming can be carried out at room temperature or when manufacturing integral foams at temperatures of 25°– 100°C.

Suitable surface-active agents for regulating the pore structure are, in particular, non-ionic materials, such as esters, containing hydroxyl groups, of fatty acids, such as lauric acid, palmitic acid, stearic acid or oleic acid, with polyhydric alcohols, such as sorbitol, and their addition products formed by reaction of ethylene oxide at the free hydroxyl groups ("Tweens"), for example polyoxyethylene-sorbitane monolaurate or monostearate, and also polyoxyglycols ("Pluronics"). The silicone oils are known to be good pore regulators. They are suitably employed in amounts of 0.1 – 0.5 per cent by weight, relative to the mixture of resin and compound of the formula I, Blowing agents which can be used are halogenohydrocarbons, such as monofluorotrichloromethane, monofluorodichloromethane, trifluorotrichloroethane and methylene chloride, and hydrocarbons such as isopentane, pentane, hexane, cyclopentane and cyclohexane.

Further, dyestuffs, fillers, plasticisers or flame-proofing agents can be added to the mixture, for example $Al_2O_3H_2O$, polyethylene, polypropylene or polyvinyl chloride.

The foam mixtures can be processed manually or by means of a suitable machine.

The pot life of the foam mixture depends on the particular epoxide resin and catalyst used and on the temperature chosen. Normally, foaming starts 10 to 600 seconds after the mixing process.

To manufacture integral foams, mixtures which foam up shortly after introduction into the mould are mostly employed.

In this way, cycle times of 10 – 20 minutes can be achieved. The foams obtained are distinguished by a homogeneous pore structure; they are white in colour and largely light-fast. They show no tendency to shrink or form cracks and can be obtained with improved heat stability. Both as free foams and when produced by the integral process they show no tendency to crack formation or hairline crack formation, even if large pieces or blocks of foam are being manufactured. The foams can be employed in sandwich constructions, or as insulating materials against cold and heat, sound and mechanical impact, and in the electrical industry. They can also be used for the manufacture of furniture, windows or doorframes. They can also be used in the form of decorative sheets. Further, it is possible to obtain foams which have good adhesion to aluminium or other metals, plastics or wood covering layers, if the resins are suitably chosen, particularly if resins containing hydroxyl groups are employed.

Surprisingly, the process according to the invention makes it possible simultaneously to fulfil, with epoxide compounds, the following conditions which are essential for the manufacture of perfect foams: rapid and complete foaming, as a rule at between 50° and 80°C, no cracks or hairline cracks and no shrinkage of the foamed articles. The mixture can be used in any size of batch without having to change the resin/curing agent ratio, and can be used for the manufacture of foams of very diverse densities.

Using the process according to the invention, integral foam mouldings can be obtained in a simple manner. Such structural foams have advantageous electrical, thermal and mechanical properties, such as high breakdown resistance, low tg δ and temperature-independent stability. They are largely light-fast and their skin thickness can be varied from between simple densification to several millimetres.

The new process can be carried out on commercially available mixing and metering machines, in the same way as when using polyurethane systems. The cycle times for the manufacture of integral foams lie in the range of the times achievable with a polyurethane system.

The manufacture of cyclohexanone-2,2,6,6-tetrapropionic acid glycidyl ester and the corresponding methyl derivative is described below.

The surfaces obtained show a flawless appearance, so that for many purposes the mouldings can be used without a subsequent surface treatment.

Cyclohexanone-2,2,6,6-tetrapropionic acid glycidyl ester 193 g (0.5 mol) of cyclohexanone-2,2,6,6-tetrapropionic acid manufactured according to BRUSON & RIENER (J.Am.Chem.Soc. 64, 1942, page 2850), 1,295 g (14.0 mols) of epichlorohydrin and 14 g of 50% strength aqueous tetramethylammonium chloride solution are first introduced into a sulphonation flask equipped with a Hefel separator, thermometer, dropping funnel and stirrer. The mixture is heated to 90°C and the addition reaction of the epichlorohydrin, which may take place slightly exothermically, is followed potentiometrically. The pH value rises from 5 to 10 over the course of about one hour, after which the mixture is allowed to cool to 50°C. A further 7 g of 50% strength tetramethylammonium chloride solution are added at this temperature and the dropwise addition of 184 g (2.3 mols) of 50% strength aqueous sodium hydroxide solution is started, the water from the sodium hydroxide solution and the water of reaction being simultaneously removed azeotropically at 70–80 mm Hg. After about one and a half hours, the addition of sodium hydroxide solution is complete. After the theoretical amount of water (139 ml) has been separated off, the sodium chloride which has precipitated is filtered off warm and the filtrate is neutralised with 200 g of 10% strength NaH$_2$PO$_4$ solution and washed with 250 ml of water. The filtrate is then dried with sodium sulphate and the epichlorohydrin is stripped off in vacuo at 80°C. The residue is dried additionally for 30 minutes at 100°C.

4-Methylcyclohexanone-2,2,6,6-tetrapropionic acid glycidyl ester a. 4-Methylcyclohexanone-2,2,6,6-tetrapropionitrile

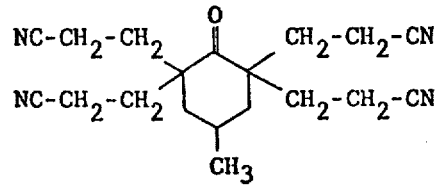

98 g (0.875 mol) of 4-methyl-cyclohexanone, 4.4 g of 40% strength aqueous potassium hydroxide solution and 273 g of t-butanol are initially introduced into a sulphonation flask equipped with a stirrer, thermometer and dropping funnel. 185.5 g (3.5 mols) of acrylonitrile are added dropwise, with good stirring, at a rate such that a temperature of 40° – 50°C can be maintained by means of the exothermic reaction. After completion of the addition of the acrylonitrile, the mixture is allowed to react for a further four hours at room temperature and is then cooled to 5°C, and the thick crystal sludge is filtered off, washed with water and dried in vacuo at 80°. 262 g (92% of theory) of crude product of melting point 125°C are obtained.

10 g of the crude product can be recrystallised from a mixture of 40 ml of acetone and 150 ml of ethanol. 9 g of white crystals of melting point 129°C are obtained.

b. 4-Methylcyclohexanone-2,2,6,6-tetrapropionic acid

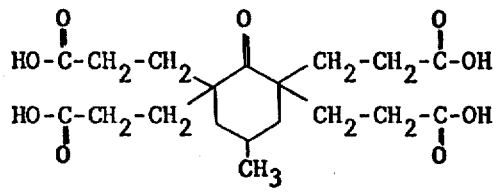

195 g (0.6 mol) of 4-methyl-cyclohexanone-2,2,6,6-tetrapropionitrile, 168 g (3 mols) of solid potassium hydroxide and 1,680 g of water are initially introduced into a sulphonation flask equipped with a stirrer, thermometer and reflux condenser. The mixture is heated to the reflux temperature whilst stirring well and is allowed to boil until all the nitrile has dissolved. The mixture is then cooled to room temperature and rendered acid to Congo Red with about 300 g of concentrated hydrochloric acid. The batch is diluted with 500 ml of water and cooled, and the acid is filtered off, thoroughly washed with water and dried in vacuo at 80°C. 220 g (91.7% of theory) of the tetrapropionic acid are obtained in the form of a white powder of melting point 190°–191°C, having an acid content of 98.8% of theory.

c. 4-Methyl-cyclohexanone-2,2,6,6-tetrapropionic acid glycidyl ester

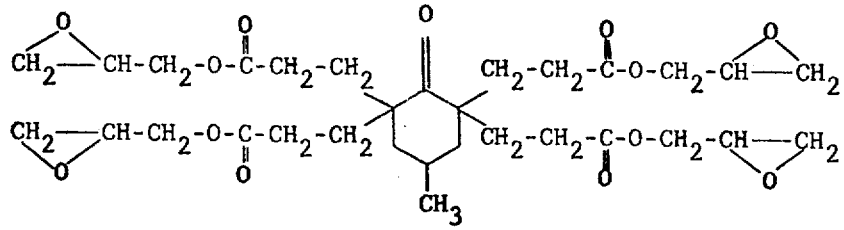

250 g (0.625 mol) of 4-methyl-cyclohexanone-2,2,6,6-tetrapropionic acid, 1,618 g (17.5 mols) of epichlorohydrin and 17.5 g of 50% strength aqueous tetramethylammonium chloride solution are initially introduced into a sulphonation flask equipped with a Hefel separator, thermometer, dropping funnel and stirrer. The mixture is heated to 90° and the addition reaction of the epichlorohydrin, which takes place slightly exothermically, is followed by measuring the pH. The pH value rises from 5 to 10 over the course of about 1 hour, after which the mixture is allowed to cool to 50°C. At this temperature, a further 8.7 g of 50% strength tetramethylammonium chloride solution are added and the dropwise addition of 229 g (2.87 mols) of 50% strength aqueous sodium hydroxide solution is commenced, the water from the sodium hydroxide solution and the water of reaction being simultaneously removed azeotropically at 70–80 mm Hg. The addition of the sodium hydroxide solution is complete after about one hour. After the theoretical amount of water (165 ml) has been separated off, the sodium chloride which has precipitated is filtered off warm and washed with epichlorohydrin. The filtrate is neutralised with 100 ml of 5% strength $NaH_2PO_4$ solution and the aqueous phase is separated off. The organic phase is washed with 250 ml of water and dried with sodium sulphate after separating off the wash water. The epichlorohydrin is then stripped off in vacuo at 80°. The resin residue is additionally dried for 30 minutes at 100°C.

Yield: 284 g (85.2% of theory) of a highly viscous, clear resin of epoxide content 5.72 equivalents/kg (89% of theory).

The parts in the examples which follow denote parts by weight.

EXAMPLE 1

A resin mixture is prepared by mixing 37.5 parts of an epoxide resin based on bisphenol A and having an epoxide equivalent weight of 190 with 12.5 parts of cyclohexanone-2,2,6,6-tetrapropionic acid tetraglycidyl ester.

0.1 part of a silicone oil, and monochlorotrifluoromethane ("Freon 11") as a blowing agent, are added to this mixture.

The curing agent mixture consists of 0.25 part of $BF_3$-dihydrate and 8 parts of a tetrafunctional polyol based on pentaerythritol (OH equivalent weight 150, molecular weight range 570 – 620, density 1.05, $\eta$ at 25°C 1,200 cps). The resin and curing agent are mixed at room temperature, and foamed. The values indicated in Table I are measured.

Following the same procedure as in Example 1, twofold (Example 2), four-fold (Example 3) and eight-fold (Example 4) amounts of resin and curing agent mixtures are mixed together and foamed. The results of the measurements are shown in Table I.

Table 1

| Example | Time required for foaming to start | Time required for foaming to be complete | Tack-free time | Volume |
| --- | --- | --- | --- | --- |
| 1 | 1'30'' | 3'30'' | 7' | 0.5 liter |
| 2 (2-fold amounts) | 1'40'' | 3'30'' | 7' | 0.9 liter |
| 3 (4-fold amounts) | 1'45'' | 4' | 6'30'' | 2.3 liters |
| 4 (8-fold amounts) | 1'45'' | 4' | 6' | 5.2 liters |

All the foams are white and have homogeneous and fine pore structures. They exhibit neither shrinkage nor cracks.

EXAMPLE 5

A resin mixture is prepared by mixing 37.5 parts of an epoxide resin based on bisphenol A and having an epoxide equivalent weight of 190 with 12.5 parts of cyclohexanone-2,2,6,6-tetrapropionic acid glycidyl ester. 0.1 part of a silicone oil and 5 parts of the blowing agent monochlorotrifluoromethane are added to this mixture.

The curing agent mixture consists of 0.25 part of $BF_3$-dihydrate and 8 parts of a trifunctional polyol based on glycerol (OH equivalent weight 133, molecular weight range 400–450, density 1.05, $\eta$ at 25°C 400 cps). The resin and curing agent are mixed at room temperature and foamed. The values indicated in Table II are measured.

Following the same procedure as in Example 5, twofold (Example 6), four-fold (Example 7) and eight-fold (Example 8) amounts of resin and curing agent mixtures are mixed together and foamed. The results of the measurements are shown in Table II.

Table II

| Example | Time required for foaming to start | Time required for foaming to be complete | Tack-free time | Volume |
|---|---|---|---|---|
| 5 | 2'30'' | 4' | 7' | 0.6 liter |
| 6 (2-fold amount) | 2'30'' | 5' | 7' | 1 liter |
| 7 (4-fold amount) | 2'35'' | 4'30'' | 7' | 2.7 liter |
| 8 (8-fold amount) | 2'35'' | 5' | 7' | 4 liter |

The foams are white and fine-pored. They show neither shrinkage nor cracks.

EXAMPLE 9

A resin mixture is prepared by mixing 37.5 parts of an epoxide resin based on bisphenol A and having an epoxide equivalent weight of 190 with 12.5 parts of cyclohexanone-2,2,6,6-tetrapropionic acid glycidyl ester.

0.1 part of a silicone oil and 5 parts of monochlorotrifluoromethane are added to this mixture.

The curing agent mixture consists of 0.25 part of BF$_3$-dihydrate and a mixture of 5 parts of a diol based on dipropylene glycol (OH equivalent weight 200, molecular weight range 400–450, density 1.01 $\eta$ at 25°C 50 cps) and 5 parts of a tetrafunctional polyol based on pentaerythritol (OH equivalent weight 100, molecular weight range 397–419, density 1.08, $\eta$ at 25°C 4,500 cps).

The resin and curing agent are mixed at room temperature and foamed. The values indicated in Table III are measured.

Following the same procedure, two-fold (Example 10), four-fold (Example 11) and eight-fold (Example 12) amounts of resin and curing agent mixtures are mixed together and foamed. The results of the measurements can be seen from Table III:

Table III

| Example | Time required for foaming to start | Time required for foaming to be complete | Tack-free time | Volume |
|---|---|---|---|---|
| 9 | 3'45'' | 6' | 7'30'' | 0.6 liter |
| 10 (2-fold amount) | 3'30'' | 5'30'' | 8' | 1 liter |
| 11 (4-fold amount) | 2'45'' | 5' | 8' | 2.5 liter |
| 12 (8-fold amount) | 2'40'' | 5'30'' | 8' | 5.3 liter |

Fire-pored white foams, which show neither shrinkage nor cracks, are obtained.

EXAMPLE 13

A resin component of the following composition is prepared: 300 parts of epoxide resin based on bisphenol A and having an epoxide equivalent weight of 190, 100 parts of cyclohexanone-2,2,6,6-tetrapropionic acid glycidyl ester, 0.8 part of a silicone oil and 40 parts of monochlorotrifluoromethane as a blowing agent.

The curing agent component has the following composition: 4.8 parts of diphenylamine/BF$_3$ complex and 64 parts of diol having an OH equivalent weight of 200 (as in Example 9).

The resin and curing agent are mixed at room temperature, using a high speed stirrer, and foamed.

The time required for foaming to start is 1'45'' and the time required for foaming to be complete is 4'. The volume is 3.5 litres.

The foam obtained is white and free from shrinkage and from cracks. It has a density of 0.124 g/cm$^3$ and a compressive strength of 107 kg/mm$^2$.

EXAMPLE 14

A resin mixture which contains the following constituents is used: 75 parts of epoxide resin based on bisphenol A and having an epoxide equivalent weight of 190, 25 parts of cyclohexanone-2,2,6,6-tetrapropionic acid glycidyl ester, 0.2 part of a surface-active agent ("Si 3193" silicone oil) and 10 parts of monochlorotrifluoromethane as the blowing agent.

The curing agent consists of: 0.5 part of BF$_3$-dihydrate and 6 parts of diethylene glycol.

The resin and curing agent are mixed at room temperature and foamed. The time required for foaming to start is 4' and the time required for foaming to be complete is 5'. The volume is 1.5 litres. A white homogeneous foam is thus obtained, which shows neighter shrinkage nor cracks.

EXAMPLE 15

A resin mixture of the following composition: 75 parts of an epoxide resin based on bisphenol A and having an epoxide equivalent weight of 190, 25 parts of cyclohexanone-2,2,6,6-tetrapropionic acid glycidyl ester, 0.2 part of a silicone oil and 10 parts of monochlorotrifluoromethane as the blowing agent is mixed at room temperature with a curing agent of the following composition: 1.2 parts of diphenylamine/BF$_3$-complex and 6 parts of diethylene glycol, and the mixture is foamed.

The time required for foaming to start is 2'30'' and the time required for foaming to be complete is 4'30''. The volume is 1.5 litres. The resulting foam has no cracks and shows no shrinkage.

EXAMPLE 16

A resin mixture consisting of: 150 parts of epoxide resin based on bisphenol A and having an epoxide equivalent weight of 190, 50 parts of cyclohexanone-2,2,6,6-tetrapropionic acid glycidyl ester, 2 parts of silicone oil and 10 parts of pentane as the blowing agent is mixed with 100 parts of a curing agent consisting of 98% of tetrahydrofurfuryl phthalate and 2% of BF$_3$-dihydrate. The time required for foaming to start is 20' and the time required for foaming to be complete is 2'30''. The volume is 2.6 litres. The resulting foam is beige in colour and free of cracks and shrinkage, and has a fine pore structure.

EXAMPLE 17

The same resin and curing agent composition as in Example 16 is processed using a 2-component metering and mixing machine. This given blocks of foamed resin which are free of cracks and shrinkage and have the following mechanical properties:

d = 0.071 g/cm$^3$
Compressive strength (kg/cm$^2$) = 5.11
Flexural strength (kg/cm$^2$) = 9.24
Deflection (mm) = 6.2

EXAMPLE 18

The following resin mixtures are prepared

A. 75 parts of epoxide resin based on bisphenol A and having an epoxide equivalent weight of 190, 25 parts of cyclohexanone-2,2,6,6-tetrapropionic acid glycidyl ester, 0.2 part of silicone oil and 5 parts of pentane.

B. 100 parts of epoxide resin based on bisphenol A and having an epoxide equivalent weight of 190, 0.2 part of silicone oil and 5 parts of pentane.

The two resin mixtures are each separately mixed with the same curing agent mixture of the following composition: 49 parts of tetrahydrofurfuryl phthalate and 1 part of BF$_3$-dihydrate.

The values measured are shown in Table IV.

Table IV

|  | A | B |
|---|---|---|
| Time required for foaming to start | 20″ | 20″ |
| Time required for foaming to be complete | 3′ | 1′30″ |
| Temperature on completion of foaming | 60°C | 85°C |
| Tack-free time | 7′ | 1′10″ |
| Cracks | None | Yes |

EXAMPLE 19

The following composition is used to produce an integral foam: 50 g of epoxide resin based on bisphenol A and having an epoxide equivalent weight of 190, 20 g of cyclohexanone-2,2,6,6-tetrapropionic acid glycidyl ester, 0.2 g of silicone oil, 4 g of pentane, 0.6 g of BF$_3$-dihydrate and 37 g of tetrahydrofurfuryl phthalate.

A steel tube 18 cm high and of 5 cm diameter is brought to 40°C. The mixture is poured into this and the mould is closed immediately. 8 minutes after introducing the mixture, the mould is cooled in cold water. 10 minutes after closing the mould, the moulding is released. A foamed article having a density of 0.28 g/cm$^3$ and an approximately 2 mm thick skin has been produced.

If the mould is preheated to 60°C, a foamed article of the same density, with a 1 mm thick skin is obtained.

If, in the above composition, the 20 g of cyclohexanone 2,2,6,6-glycidyl ester are replaced by 20 g of an epoxide resin based on bisphenol A and having an epoxide equivalent weight of 190, a foamed article which has numerous cracks is obtained.

EXAMPLE 20

The following resin mixture and curing agent mixture is used to produce an integral foamed resin slab Resin mixture: 315 g of epoxide resin based on bisphenol A and having an epoxide equivalent weight of 190, 105 g of cyclohexanone-2,2,6,6-tetrapropionic acid glycidyl ester, 0.6 g of silicone oil and 36 g of monochlorotrifluoromethane.

Curing agent mixture: 52 g of a tetrafunctional polyol having an OH equivalent of 150 (as in Example 1) and 2.1 g of BF$_3$-dihydrate.

The mould is prewarmed to 40°C. After introducing the mixture, the mould is closed and the temperature is raised to 80°C. The mixture is cured for 20′. After cooling, a foamed article having an excellent structure and an overall density of 0.48 g/cm$^3$ is obtained.

EXAMPLE 21

A resin mixture consisting of: 200 parts of epoxide resin based on bisphenol A and having an epoxide equivalent weight of 190, 75 parts of cyclohexanone-2,2,6,6-tetrapropionic acid glycidyl ester, 25 parts of an adduct (epoxide equivalent weight 422) of a liquid bisphenol-A diglycidyl ether (epoxide equivalent weight 187) and an acid polyester of adipic acid and hexanediol in the molar ratio of 11:10 (compare Example 8 of French Patent Specification 1,559,969), 0.6 part of silicone oil and 15 parts of pentane is mixed with 150 parts of a mixture consisting of 98% of tetrahydrofurfuryl phthalate and 2% of BF$_3$-dihydrate for 20″, using a high-speed stirrer. The time required for forming to start is 30′ and the time required for foaming to be complete is 2′.

The volume is 2.6 liters. A foam having a fine pore structure and exhibiting neither cracks nor shrinkage is obtained.

EXAMPLE 22

A resin mixture consisting of: 65 parts of epoxide resin based on bisphenol A and having an epoxide equivalent weight of 190, 20 parts of epoxide resin based on bisphenol A and having an epoxide equivalent weight of 450, 15 parts of cyclohexanone-2,2,6,6-tetrapropionic acid glycidyl ester, 0.2 part of silicone oil, 100 parts of aluminium oxide trihydrate and 15 parts of monochlorotrifluoromethane is mixed with a curing agent consisting of 0.7 part of BF$_3$-dihydrate and 6 parts of diethylene glycol, for 60″ using a high speed stirrer.

This mixture is then poured into a mould, prewarmed to 40°C, which is made from cured epoxide resin containing aluminium powder. The mould is closed immediately and is again opened after a curing time of 10 minutes. The resulting hard, fine-poured foam is self-extinguishing.

EXAMPLE 23

A resin mixture consisting of: 75 parts of an epoxide resin based on bisphenol A and having an epoxide equivalent weight of 190, 25 parts of 4-methyl-cyclohexanone-2,2,6,6-tetrapropionic acid tetraglycidyl ester, 0.2 part of a silicone oil and 10 parts of pentane as the blowing agent is mixed for 20 seconds, using a high speed stirrer, with the following curing agent: 49 parts of tetrahydrofurfuryl phthalate and 1 part of BF$_3$-dihydrate.

The time required for foaming to start is measured to be 45 seconds, and the time for foaming to be complete is measured to be 3 minutes. The volume is 0.6 liter.

The resulting light beige foam exhibits neither cracks nor shrinkage.

EXAMPLE 24

A resin mixture consisting of: 75 parts of epoxide resin based on bisphenol A and having an epoxide equivalent weight of 190, 25 parts of cyclohexanone-2,2,6,6-tetrapropionic acid tetraglycidyl ester, 0.2 part of a silicone oil and 5 parts of pentane is intimately mixed for 20 seconds by means of a high speed mixer, with the following curing agent component: 10 parts of tetrahydrofurfuryl phthalate and 0.5 part of $BF_3$-dihydrate.

The mixture is introduced into an iron mould which has been prewarmed to 50°C.

After 15 minutes the mould is opened and the foamed article is removed. It has a thin skin, and a density of 0.2 g/cm$^3$.

EXAMPLE 25

If the same procedure as in Example 24 is followed with the same resin but with the following composition of curing agent: 10 parts of tetrahydrofurfuryl phthalate and 1.5 parts of chloroaniline-$BF_3$ complex, 15 minutes' curing at 60°C in the same mould gives a foam which has an 0.5 mm thick skin and a density of 0.2 g/cm$^3$.

EXAMPLE 26

Manufacture of a ski component.

A resin mixture consisting of 225 parts of epoxide resin based on bisphenol A and having an epoxide equivalent weight of 190, 75 parts of cyclohexanone-2,2,6,6-tetrapropionic acid tetraglycidyl ester, 0.6 part of a silicone oil and 25 parts of trichloromonofluoromethane as the blowing agent is mixed, by means of a high speed stirrer, with the following curing agent component: 15 parts of diethylene glycol and 1.8 parts of $BF_3$-dihydrate.

This mixture is immediately introduced into a mould of size 40 × 9 × 2 cm which is provided with 2 aluminium sheets. After curing for 30 minutes at 80°C, the piece of foam, which now firmly adheres to the 2 aluminium sheets and thus forms a sandwich construction, is removed. The foam density is 0.38 g/cm$^3$. After three weeks' storage at room temperature, the following mechanical values are determined on the sandwich obtained:

$F_{max} = 475$ kg
$\delta_B = 57.6$ N/mm$^2$
$E_B = 7,170$ N/mm$^2$
$S_B = 435$ MN/mm$^2$ The symbols denote the following:

$F_{max}$ = the maximum breaking force in a 3-point flexural test on the sandwich
$\delta_B$ = flexural strength
$E_B$ = flexural E-modulus
$S_B$ = flexural rigidity.

The adhesion to the aluminium is excellent.

EXAMPLE 27

A resin mixture consisting of: 75 parts of bisphenol A resin having an epoxide equivalent weight of 190, 10 parts of hexanetriol diglycidyl ether, 15 parts of cyclohexanone-2,2,6,6-tetrapropionic acid glycidyl ester, 0.2 part of silicone oil, 100 parts of aluminium hydroxide and 15 parts of trichloromonofluoromethane as the blowing agent is mixed with 67 parts of a curing agent consisting of: 60 parts of diethylene glycol and 7 parts of $BF_3/2H_2O$ and the mixture is poured into a mould warmed to 40°C. The resulting foamed article, which is released after 10 minutes, has a density of 0.2 g/cm$^3$ and has an integral structure.

The inflammability test shows that the foam ceases to burn immediately the flame is removed.

What we claim is:

1. Process for the manufacture of epoxide resin foams using a resin mixture which contains an epoxide resin based on bisphenol A or a polyester containing epoxide groups and/or an aliphatic polyglycidyl ether and/or a cycloaliphatic epoxide resin and also a blowing agent and a surface-active agent for regulating the pore structure, characterised in that the resin mixture furthermore contains the tetraglycidyl ester of cyclohexanone- or methylcyclohexanone-tetrapropionic acid of the formula I

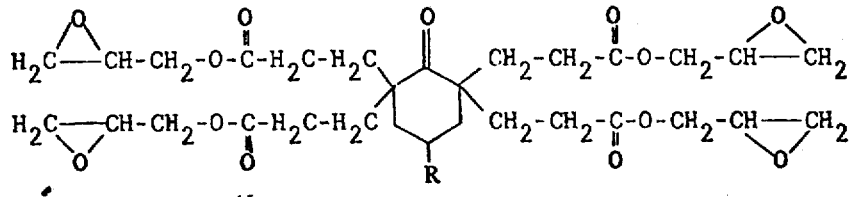

in which R denotes hydrogen or the methyl group, and that the curing is carried out with a Lewis acid or an addition compound or complex compound of a Lewis acid.

2. Process according to claim 1, characterised in that the ratio of epoxide resin to compound of the formula I in the resin mixture is 25 to 75 per cent by weight to 75 to 25 per cent by weight.

3. Process according to claim 1, characterised in that the curing agent is employed in an amount of 0.3 to 2 per cent by weight, based on the resin mixture.

* * * * *